(12) United States Patent
Vininski et al.

(10) Patent No.: US 7,314,506 B2
(45) Date of Patent: Jan. 1, 2008

(54) FLUID PURIFICATION SYSTEM WITH LOW TEMPERATURE PURIFIER

(75) Inventors: Joseph V. Vininski, Boulder, CO (US);
Robert Torres, Jr., Parker, CO (US);
Virginia H. Houlding, Boulder, CO (US); Harold Spicer, Dayton, OH (US)

(73) Assignee: Matheson Tri-Gas, Inc., Longmont, CO (US)

( * ) Notice: Subject to any disclaimer, the term of this patent is extended or adjusted under 35 U.S.C. 154(b) by 0 days.

(21) Appl. No.: 11/252,200

(22) Filed: Oct. 17, 2005

(65) Prior Publication Data

US 2006/0086247 A1 Apr. 27, 2006

Related U.S. Application Data

(60) Provisional application No. 60/621,871, filed on Oct. 25, 2004.

(51) Int. Cl.
*B01D 53/04* (2006.01)
(52) U.S. Cl. .............................. 95/114; 95/115; 96/108; 96/153
(58) Field of Classification Search ................. 96/108, 96/126, 153; 95/90, 106, 114, 115
See application file for complete search history.

(56) References Cited

U.S. PATENT DOCUMENTS

| | | | |
|---|---|---|---|
| 5,858,065 A * | 1/1999 | Li et al. .......................... 95/45 |
| 6,110,258 A | 8/2000 | Fraenkel et al. |
| 6,425,946 B1 | 7/2002 | Funke et al. |
| 6,461,411 B1 | 10/2002 | Watanabe et al. |
| 6,491,884 B1 * | 12/2002 | Faller et al. ................. 423/210 |
| 6,579,343 B2 | 6/2003 | Brennecke et al. |
| 6,733,734 B2 | 5/2004 | Watanabe et al. |
| 6,755,892 B2 * | 6/2004 | Nalette et al. .................. 95/11 |
| 6,783,576 B2 | 8/2004 | Funke et al. |
| 6,783,577 B2 | 8/2004 | Funke et al. |
| 6,790,358 B2 | 9/2004 | Funke et al. |
| 2001/0022135 A1 * | 9/2001 | Murai .......................... 95/138 |
| 2002/0178923 A1 * | 12/2002 | Kishovich et al. ............. 96/135 |
| 2003/0209142 A1 * | 11/2003 | Schimkat et al. ............. 95/113 |
| 2004/0069144 A1 * | 4/2004 | Wegeng et al. ............... 95/106 |
| 2004/0206241 A1 | 10/2004 | Tempel et al. |

* cited by examiner

*Primary Examiner*—Frank M. Lawrence
(74) *Attorney, Agent, or Firm*—Townsend and Townsend and Crew LLP

(57) ABSTRACT

A system and method for processing a matrix fluid to remove one or more impurities (such as moisture from a process gas). The purifier includes a pre-cooler that receives the matrix fluid and cools the matrix fluid to a second, lower temperature. A container is provided to contain a purifier element made up of a high surface area material. The container includes an inlet for receiving the matrix fluid from the pre-cooler and an outlet for outputting the matrix fluid after it is forced to flow through the purifier element. The purifier includes a cooler in thermal contact with an outer surface of the container to cool the outer surface of the container to a purifying temperature, which is selected to be below the ambient temperature and above a phase change point of the matrix fluid and is typically in the range of about 0 to $-200°$ C.

18 Claims, 8 Drawing Sheets

FLUID PURIFICATION SYSTEM WITH LOW TEMPERATURE PURIFIER

CROSS-REFERENCE TO RELATED APPLICATIONS

This application claims the benefit of U.S. Provisional Application No. 60/621,871, filed Oct. 25, 2004, entitled "'PICO TRAP' Cryogenic Purifier for Removal of Impurities Fluids from a Matrix Fluid," which is incorporated in its entirety herein by reference.

BACKGROUND OF THE INVENTION

1. Field of the Invention

This invention relates to the field of fluid purification including the field of ultra-pure process gas purification such as those used in the semiconductor industry, and more specifically, to a fluid purification system, and associated methods, utilizing a purifier with a cooler (i.e., a cooled or cryogenic purifier) to remove impurities from a matrix gas with temperature purification or filtering medium or media mixture, such as a high surface area material, maintained at a reduced or low temperature.

2. Description of the Prior Art

There is a growing demand for process gases and other fluids that are almost free of impurities. Many production and other uses of gases require impurities levels, such as moisture levels, to be at or less 10 parts per billion (ppb), and these gases are often considered ultra-pure gases.

The semiconductor industry provides a specific example of the growing demand for ultra-pure process gases or fluids, e.g., matrix gas or fluid that needs to be purified by removing impurities. As semiconductor integrated devices become smaller and the devices using semiconductor integrated devices become more sophisticated, there are increasing demands for the physical and chemical properties of the actual semiconductor material to have properties nearer to the ideal and intrinsic properties of the semiconductor material. The manufacture of semiconductors involves the use of reactive gases that are composed of various elements. In addition, manufacturing processes such as metal-organic chemical vapor deposition (MOCVD) and other related manufacturing techniques are used in the manufacture of semiconductors. In these processes, the purity of the reactive gases plays a large part in determining the resulting quality of the semiconductor device being manufactured, and in particular, the electronic quality and characteristics of the manufactured semiconductor device. Consequently, there is an increasing demand in the microelectronics industry for ultra-pure process gases. The semiconductor industry provides just one example of the increased demand for ultra-pure process gases, and to meet these demands, methods for ultra-purification of gases have experienced extensive technological effort and advances.

Ultra-pure gases are generally produced by processing a matrix or process gas with a purification system that includes a purifier that uses a variety of filtering or purifying media and/or mechanical filters and other devices to remove impurities from the matrix or process gas, e.g., to remove moisture to obtain moisture levels in the matrix or process gas of less than 10 ppb. Presently, most of the research and development efforts have been directed toward producing media for use in the purifier that can effectively remove impurities as the gas (or other fluid) flows through the purifier. High surface area materials are often used as purifier media to create a substrate, such as a substrate of very small beads or the like, that is provided in a purifier canister, and a matrix or process gas is forced to flow through the substrate at a particular flow rate and pressure.

Development efforts have led to purifier media that are capable of removing trace impurities in process fluids to levels well below 1 part per million (ppm) but, in some cases, the adsorption characteristics of the purifier media limit the level of impurity removal that can be achieved by a given purifier medium. For example, some purifier media or material that is used in the semiconductor industry has been tested or shown to be capable of removing moisture from matrix gas (i.e., HCl gas) flowing at ambient temperature and at a pressure of about 30 psig to levels in the range of 150 to 200 ppb. However, these levels do not satisfy the demands of the semiconductor industry which continues to demand moisture levels of 10 ppb or less for many of its processes gases, such as for HCl gas to be used in chamber and wafer cleaning applications.

Hence, there remains a need for improved methods and systems for purifying matrix fluids, such as for producing higher purity gases for use in the semiconductor industry and for many other applications. Preferably, such methods and systems would be configured to meet the increasing demand for ultra-pure gases while also being compatible with many existing gas delivery systems and allow use of many existing purifier media and/or high surface materials.

SUMMARY OF THE INVENTION

This invention provides a system (and associated method) for purifying a matrix fluid (such as a chemical gas) that achieves enhanced removal of impurities by cooling the purifying medium or material to a temperature below ambient conditions. The system generally includes a canister that holds a purifier element, such as a volume of high surface area purifying material, a prefabricated nickel or stainless steel particle filter, or the like. A cooler is provided in thermal contact with the canister to cool the canister and contained purifier element to a temperature below ambient temperature and typically, to a temperature 20 or more degrees Celsius below ambient temperature but above the phase change point for the matrix fluid at the operating flow rate and pressure of the purifying system. In some embodiments, a pre-cooler is provided upstream of the purifier canister to cool the matrix fluid prior to its contact with the purifier element, e.g., to a temperature approaching or at the purifying temperature.

More specifically, a low temperature purifier is provided for processing a matrix fluid to remove one or more impurities (such as moisture from a process gas). The purifier includes a pre-cooler that receives the matrix fluid having a first temperature, pressure, and flow rate. The pre-cooler cools the matrix fluid and outputs the matrix fluid at a second temperature lower than the first temperature. A purifier element that is made up of a volume of high surface area material is included in the purifier and a container is provided to contain the purifier element. The container includes an inlet for receiving the matrix fluid from the pre-cooler and an outlet for outputting the matrix fluid after it is forced to flow through the purifier element. The purifier further includes a cooler that is in thermal contact with an outer surface of the container so as to cool the outer surface of the container to a purifying temperature, which is selected to be below the ambient temperature and above a phase change point of the matrix fluid at the fluid's pressure and flow rate.

The pre-cooler may be cooled by a separate cooling mechanism of the purifier or be cooled by the same cooler used to cool the purifier canister. The pre-cooler is typically cooled such that the second temperature (or output temperature of the pre-cooler) of the matrix fluid is approaching or about equal to the purifying temperature. The purifying temperature typically is at least about 20 degrees Celsius below ambient and more typically in the range of about 0 to −200° C. The container can take many forms, and in one case, is a stainless steel pipe in which a metal particle filter is positioned that is made up of sintered, pressed, and/or plated nickel and/or stainless steel and/or a corrosion resistant alloy (e.g., a Hastelloy™ or the like) or other alloy that is appropriate for a specific application. In another case, the high surface area material is mordenite, zeolite, alumina, silica, carbon, molecular sieves, or a combination of these materials and the container is a canister for holding such a purifier substrate. In another embodiment, the high surface area material is coated with a reactive metal or other species designed to remove a specific impurity.

BRIEF DESCRIPTION OF THE DRAWINGS

FIG. 1 is a schematic of a purification system or apparatus of the present invention including a cooler for lowering the temperature of a purifier canister and its contents, e.g., purifier materials and mechanical filter or the like;

DETAILED DESCRIPTION OF THE INVENTION

In general, the invention is directed to an apparatus/system and method for removing one or more impurities from a matrix fluid, such as a chemical or process gas, by passing the fluid through a purifier containing a medium or media mixture designed to remove the impurities. Significantly, the purifier medium or media mixture is cooled to a purifying temperature that is lower than ambient temperature and in some embodiments, that is much lower than ambient temperature such as 20 to 200 degrees below ambient (e.g., 0 to −200° C. or lower when ambient is about 20° C., with very low purifying temperature providing a "cryo-purifier"). Such a low or lower temperature purifier is particularly well-suited for removing one or more high-boiling point impurities from a matrix fluid (e.g., a chemical gas) having a lower boiling point. Alternatively, a lower boiling point impurity can be reduced from a matrix gas having a higher boiling point if the proper purification materials are selected. In the purifier, a chosen material, purifier medium, or media mixture is placed in a container or canister or otherwise supported in the flow path of the fluid. The purifier is configured to cool the container or canister and its contents at a selected purifying temperature, and in an exemplary embodiment, a cooler is provided that cools the outer walls of the purification canister/container to a preset temperature below ambient, which results in maintaining the purifier material, medium, media, or mechanisms at a purifying temperature (e.g., a temperature approaching the temperature of the canister) so as to enhance the purifying effectiveness of the purifier.

Figure 1:
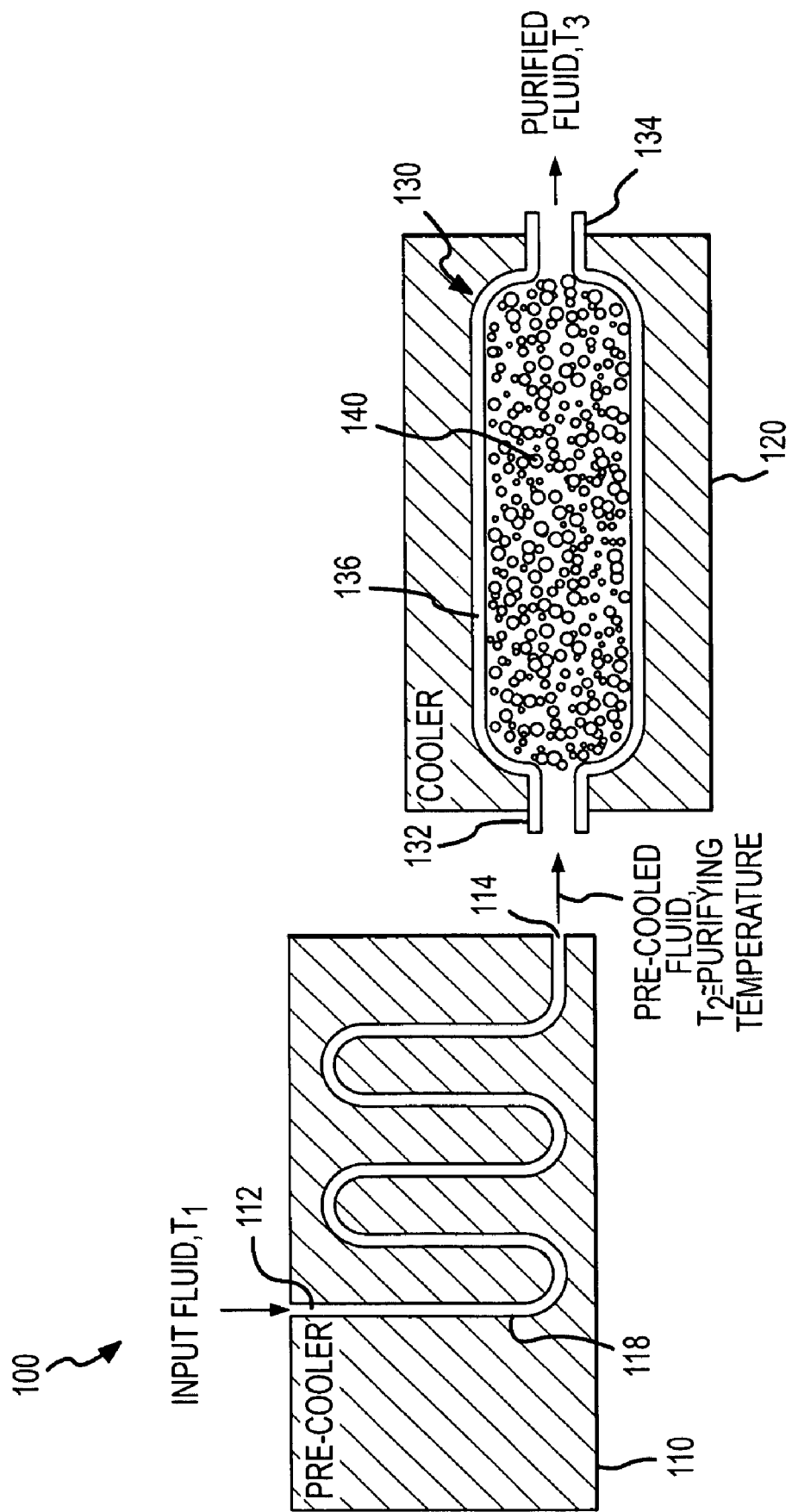

FIG. 1 illustrates one embodiment of a purifier, which may be labeled as a reduced temperature purifier, a low temperature purifier, and/or a cryo-purifier in this document. The purifier 100, as discussed above, is configured to lower the temperature of purifier material or media 140 used to remove impurities from a matrix fluid, such as a chemical gas that is to be used as a process gas for manufacture of semiconductor devices or the like. To this end, the purifier 100 is shown to include a pre-cooler 110 with an inlet 112 for receiving input fluid at a first temperature, $T_1$, and an outlet 114 for outputting fluid that is cooled or "pre-cooled" to a second, lower temperature, $T_2$. The outlet 114 is typically in fluid communication with an inlet 132 to a canister 130 that is used to contain (if purifier material, such as beads or the like, is used) or to support (if mechanical media is used) the purifier material, media, or medium (and these labels may be used interchangeability herein without an intent to limit the description or invention).

The pre-cooler 110 is shown as a separate device in purifier 100 and is shown to include piping 118 that directs the input fluid through a path of sufficient length to provide a desired cooling to the second temperature, $T_2$, which is typically chosen to be at or near the purifying temperature of the material 140. Pre-cooling of the input fluid or incoming matrix fluid is typically preferred so that the fluid input to the inlet 132 of the canister 130 does not heat up the purifier material 140 on contact, which may impact the desired improvements in purifying efficiency of the cooled purifying material 140.

The pre-cooled fluid is then input to a cooler section of the purifier via an inlet 132 to a canister or holding mechanism 130 for the purifying material, media, and/or medium 140. The matrix fluid is purified of impurities by the material 140 that is kept at a purifying temperature by a cooler 120 and the purified fluid is output at a third temperature, $T_3$, which typically is at or near the purifying temperature (but may be somewhat lower or higher to practice the invention). The cooler 120 is shown to contact the canister 130 along a canister wall 136, and in the illustrated embodiment, the cooler 120 acts to reduce the temperature of the canister wall 136 to a predetermined temperature which then results in the lowering of the purifying material 140 in the container 130 to a desired purifying temperature.

Due to the inefficiencies of heat transfer in the material 140, the purifying temperature or temperature of the material 140 will typically be higher than that of the wall 136 and may vary somewhat within the canister 130 (e.g., the temperature of material 140 adjacent the wall 136 may closer approximate the temperature of the wall 136 than material 140 distal to the wall 136 such as material 140 in the center of the canister 130). Therefore, it may be useful during operation of the purifier 100 to cool the canister 130 to a temperature lower than that of a desired temperature for the material 140, with such a temperature difference varying with the configuration of the canister 130, the material of the canister wall 136, and the material 140. In the following discussion, the purifying temperature may be referred to as the temperature of the canister wall 136 for ease of discussion and of experimental measurement, with the understanding that the material 140 may have a temperature somewhat higher. In some embodiments (not shown), heat exchanger apparatus may be provided that extend into the canister interior to improve heat transfer with the material 140 to more effectively control the material 140 at a desired purifying temperature.

Figure 7:
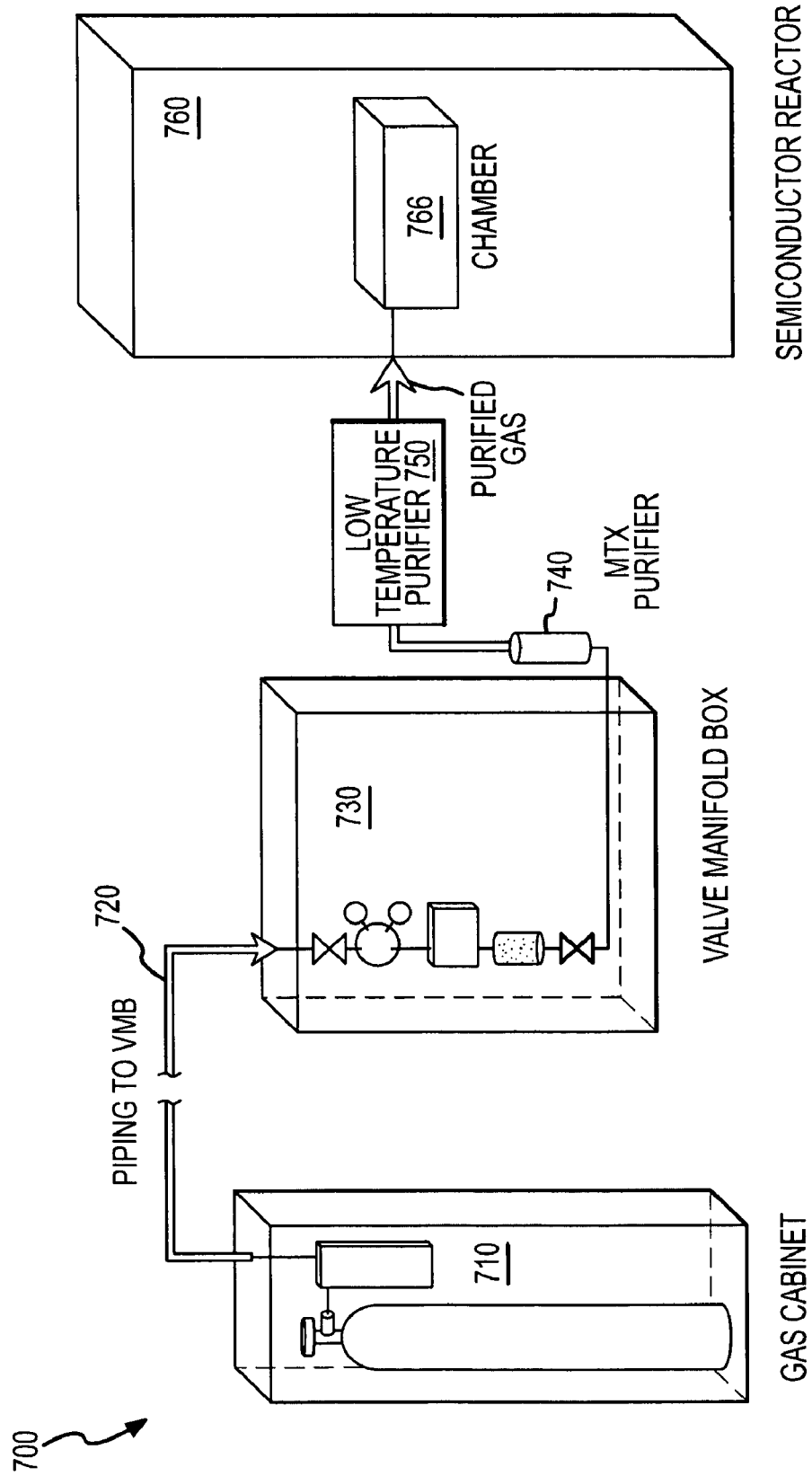
FIG. 7 illustrates a semiconductor production system including a low temperature purifier according to the present invention.
Figure 8:
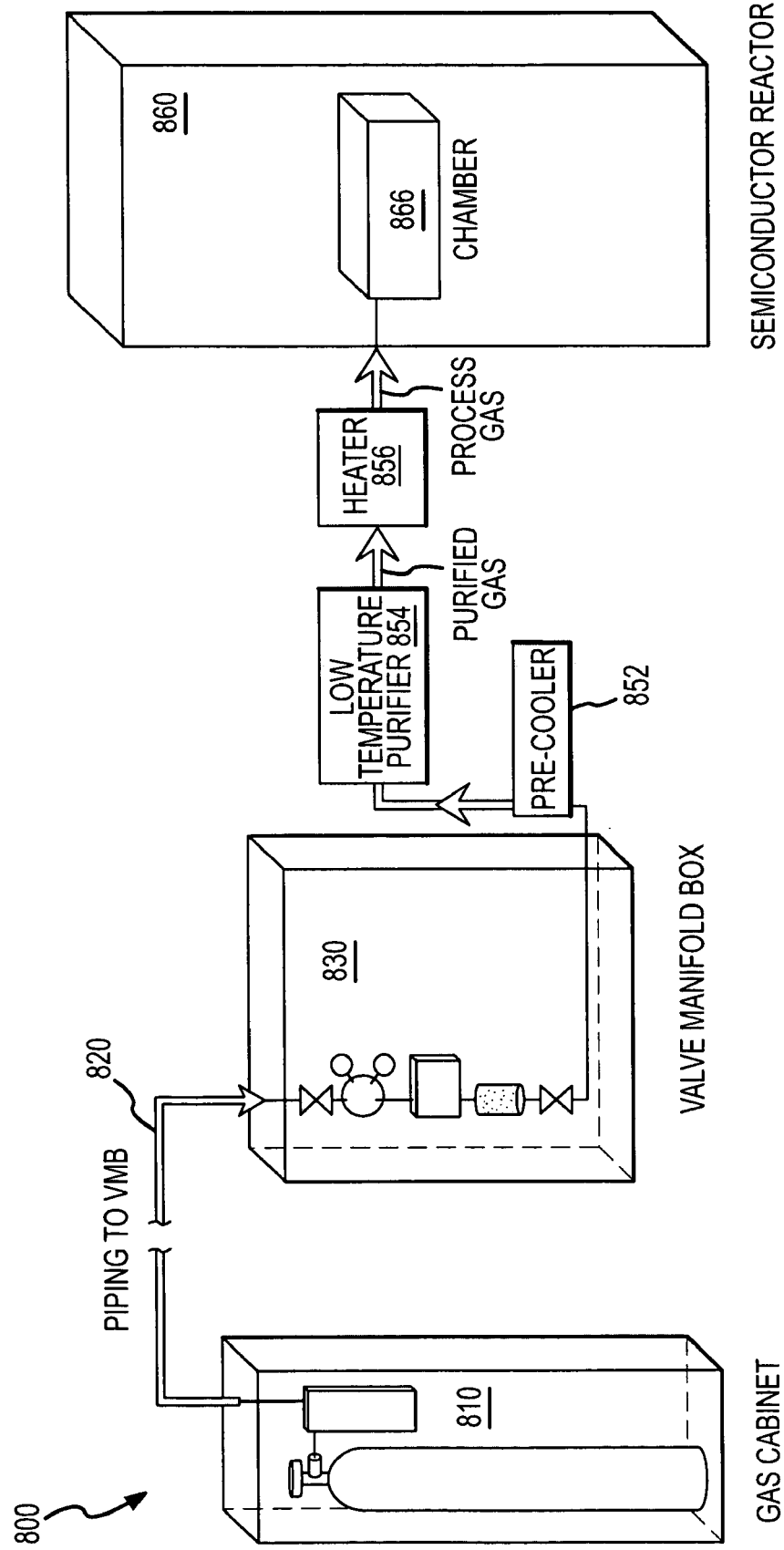
FIG. 8 illustrates another semiconductor production system similar to that shown in FIG. 7 but without additional purifiers and including a pre-cooler upstream of the low temperature purifier and a heater downstream from the low temperature purifier.

The cryo-purifier 100 is envisioned by the inventors as a compact unit that can be either a stand-alone unit or incorporated into a larger apparatus. The canister 130 may be enclosed in an insulated jacket containing the cooling mechanism of the cooler 120. The cryo-purifier 100 can be used in series with a traditional purification unit as shown in FIG. 7 or used by itself as shown in FIG. 8.

In typical embodiments of the invention, a chosen material, purifier medium, or media mixture 140 is placed into a container or canister 130 that is cooled by cooler 120. The cooling methods or mechanisms used by 110, 120 may be nearly any well-known method or mechanism to practice the invention. For example, the pre-cooler 110 and cooler 120 (which may use the same or differing cooling mechanisms or methods) may employ a refrigeration system, a thermoelectric cooler (Stirling, Peltier, and the like), solid or fluid cooling baths, vortex cooling, Venturi cooling, or any other cooling mechanism or method. The important feature of the invention is not that a particular cooling technique is used but instead the fact that the purifier 100 is configured and operated to purify the input fluid or matrix fluid using a purifier material, media, and/or medium 140 that is maintained at a temperature below ambient temperature and typically, significantly below ambient temperature, which results in significantly enhanced effectiveness of the material 140 in removing impurities in the matrix fluid flowing through the purifier canister or container 130.

The inventors believe that the concept of using low temperature surfaces to enhance the removal of impurities from a fluid, such as semiconductor process gas, is new and will provide many beneficial uses in the coming years. In fluid purifier media (such as material or media 140) that operate by an initial surface adsorption of trace impurities, the purification efficiency of a given medium is determined by the equilibrium of surface adsorption of the target species from the matrix. Lowering the temperature of a surface usually enhances both physiorption and chemisorption equilibria by decreasing the rated of desorption (see, for example, A. Adamson, "The Physical Chemistry of Surfaces," $5^{th}$ Edition, New York: Wiley Interscience, 1990). This phenomenon is shown in numerous examples throughout the surface science literature and in industrial technologies. As an example of this phenomenon, cryogenic temperatures are used in high vacuum cryo-pumps to enhance the ability of molecular sieve to scavenge trace gas phase species and achieve enhanced vacuum levels. Prior to the invention, though, the concept of using low temperature surfaces to improve the ability of purifier materials to remove impurities from a fluid was not understood or known, and the inventors believe the concept is applicable to processing of a large number of chemical gases and other fluids. The utilization of this invention will allow end users to achieve purity levels that could not be attained with conventional methods. In addition, the invention described herein allows for the removal of specific impurities that could not effectively be removed via conventional physiosorption and chemisorption.

During operation of a cryo-purifier according to the invention (such as purifier 100), there are several conditions or operating parameters that should be considered to achieve enhanced purifying results. First, the operating temperature of the purifier 100 or purifying temperature (e.g., the temperature of the wall 136 of the container 130 that the material 140 approaches or reaches) should be maintained above any phase change point of the matrix fluid at the particular operating pressure and flow rate of the matrix or input fluid (i.e., this phase change point would work as a lower limit for a purifying temperature range). For example, if the matrix fluid is a gas, the operating temperature is preferably kept above the condensation point. If the matrix fluid is a liquid, the operating temperature is preferably kept above the freezing point, and if the matrix fluid is a solution, the operating temperature is preferably kept above the saturation point of the solute.

Second, the adsorption equilibrium constant of a given impurity (i.e., an impurity targeted for removal from the matrix or input fluid) on the purifier medium, such as element 140 of canister 130, is preferably such that the target level of removal is achieved at a temperature higher than the phase change point of the matrix fluid. Third, the purifier medium (e.g., element 140) should be selected to be stable toward the matrix fluid at the operating temperature of the purifier or the purifying temperature.

When a common purifier material is employed for element 140, typically the purifier material is chosen because it is known to remove the target impurity or impurities from the matrix fluid at ambient temperature. Then, during operation of the purifier 100, the purifier temperature (or temperature at wall 136 of canister 130) is lowered to a chosen temperature that is higher than the condensation point of the matrix or input fluid under the pressure and flow conditions of the matrix fluid in the purifier 100 but that is low enough to enhance the adsorption of impurities onto the purifier surface. In some cases, the operating or purifying temperature may be any temperature below ambient temperature. More typically, though, the operating temperature for the purifier is selected to be much lower than ambient such as 20 to 220 or more degrees Celsius below ambient as these temperatures are relatively easy to obtain and provide larger improvements in adsorption by the purifier material or medium.

In some embodiments, the adsorption or purifier material 140 may be any high surface area material as these materials act to remove impurities in a matrix fluid by one or more mechanisms when the fluid contacts their surfaces. For example, the purifier material 140 may be a substrate material composed of traditional purification materials, such as those used in the semiconductor manufacturing industry including mordenite zeolite, and/or a substrate or purifier material as described in detail in U.S. Pat. Nos. 6,110,258; 6,733,734; 6,461,411; 6,425,946; 6,783,577; 6,783,576; and 6,790,358, which are each incorporated herein in their entireties by reference. The substrate materials 140 can be composed of metals, organic and/or inorganic materials, and/or carbon. In addition to adsorption, the impurities in the matrix fluid may be removed by the purifier material 140 by precipitation with the purifying temperature being lowered to a point where the impurity becomes insoluble in the matrix fluid and is removed via filtration methods (e.g., a filter may be provided in addition to or even, in some specific circumstances, in place of the material 140 as a medium 140). Expected improvements in impurity removal when lowering the purifier temperature (i.e., improved purity levels obtained in the purified fluid that it output of the purifier via outlet 134) and exemplary temperature ranges are provided with reference to FIGS. 4-6, which are described in detail below.

In another embodiment, the invention described herein may be used when the matrix gas is stored and dissolved in ionic liquids. In such a case, the gas of interest is stored within a high molecular weight and ionic material that is in the physical form of a liquid. The matrix gas is then removed from the ionic liquid by applying a vacuum or heating the storage container. While the matrix gas is being removed from the storage container, small concentrations of the ionic liquid are also emitted from the storage container since the vapor pressure of the ionic liquids is non-zero. Significantly, the present invention, as shown in FIG. 1 and later figures, may be used to remove the trace levels of ionic liquid (i.e., the removed impurity is the ionic liquid) from the matrix gas. Ionic liquids can be characterized by low melting points, high molecular weight, low vapor pressure materials that have a cation and an anion component. Such ionic liquids have been described in detail in U.S. Pat. No. 6,579,343 and U.S. Patent Application US2004/0206241 A1, which are each incorporated herein in their entirety by reference. The ionic liquids typically will be present in trace amounts, e.g., amounts of 100 ppb to 1000 ppb and often higher levels, in a matrix gas but after processing through a low temperature purifier according to the various embodiments of the invention (such as purifier 200 of FIG. 2) the ionic liquids are present in the purified matrix gas in amounts less than 100 ppb and, in some cases, even less than 10 ppb, thereby producing an ultra-pure matrix gas substantially free of the ionic liquid.

Figure 2:
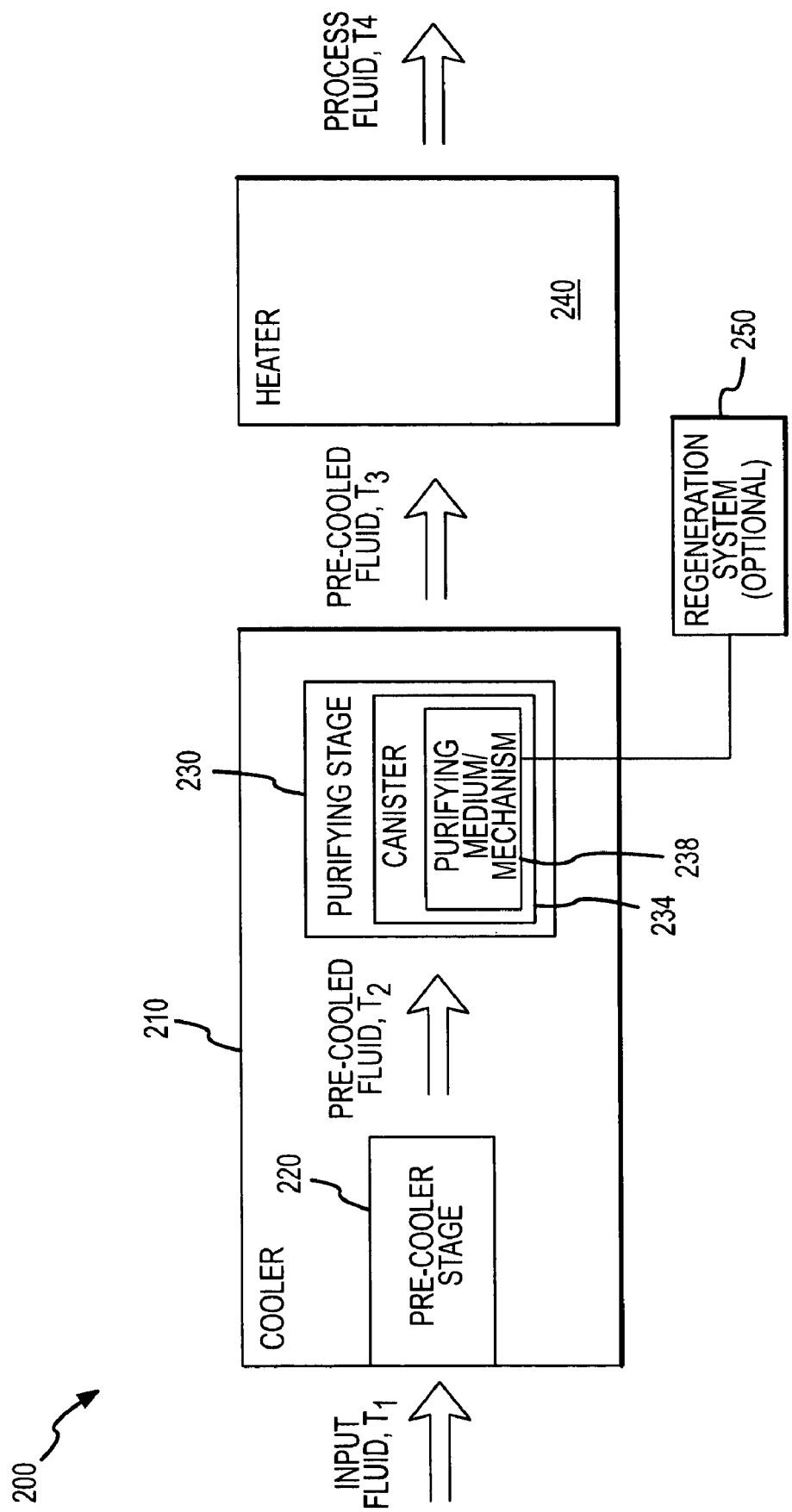
FIG. 2 is a schematic of another purification system according to the invention similar to that of FIG. 1 but having a pre-cooler stage in which cooling is provided with the same device or system as that used for cooling a purification stage.

FIG. 2 illustrates another embodiment of a low temperature purifier 200 according to the invention. The purifier 200 is similar to the purifier 100 but is useful for showing that the pre-cooler may be provided as part of the same unit or device and cooled by the same cooler or cooing mechanism(s). Purifier 200 further shows that the purified fluid may have its temperature returned to a desired process fluid temperature, such as by a heater, prior to delivery to a manufacturing process or other point of use. Yet further, purifier 200 is useful for illustrating that the purifier material may be regenerated in place to enhance purification results.

As shown, the purifier 200 includes a cooler 210 that is used to provide cooling to both a pre-cooler stage 220 and a purifying stage 230. Input fluid or matrix fluid is provided at a first temperature, $T_1$ (e.g., ambient temperature, process or point of use inlet temperature, or the like) to a pre-cooler stage 220. The cooler 210 is used to provide cooling to the pre-cooler stage 220 such that the matrix fluid has its temperature reduced to a second temperature, $T_2$, that preferably is about the purifying temperature and/or the temperature of the purifying medium/mechanism 238. In this embodiment of the purifier 200, the incoming fluid is pre-cooled (but this pre-cooling is not necessary in all cases as is shown in FIG. 7) to the purifier operating temperature (or to a temperature in a range including temperatures higher and lower than the operating temperature but above the phase change point of the matrix fluid). For example, the cooler 210 may provide heat exchange with a tube defining a path (e.g., a tortured path) through which the matrix fluid is forced to flow in the pre-cooler stage 220. The purpose of the pre-cooler stage 220 is to cool the matrix fluid prior to entry into the purifying stage 230 to minimize or control the temperature swing within the purifier chamber or canister 234 during operation of the purifier 200. This is particularly important when the purifying medium 238 is a poor conductor of heat as is the case of many purifier materials and substrates.

The pre-cooled fluid at the second temperature, $T_2$, is then directed to the purification unit or stage 230 that includes a container or canister 234 (i.e., a device or devices for holding the purifying material or mechanism 238 and for directing flow of the fluid matrix through such as element(s) 238) that contains a purification medium or mechanism 238 that is designed to trap an impurity or impurities of interest in the pre-cooled matrix fluid. The purification canister 234 has its temperature controlled (i.e., lowered to a desired purifying temperature below ambient temperature) by the cooler 210, and by carefully and selectively controlling the temperature of the canister 234 the contained purifying material, medium, and/or mechanism 238 can be controlled such that targeted impurities can be discriminately and effectively removed from the matrix fluid such as by adsorption and/or condensation. After the impurities are removed by the purifying material 238, the purified fluid is output from the purifying stage 230 at a third temperature, $T_3$, which may be the same as or substantially the same as the temperature, $T_2$, of the pre-cooled fluid or be somewhat higher or lower depending upon the temperature of the material 238 and effects of impurity removal.

As shown, a heater 240 is provided in the purifier 200. The purified fluid from the purifying stage 230 is passed to or directed to flow through the heater 240 to provide a process fluid at a fourth temperature, $T_4$, which may match a desired input for a manufacturing process or point of use. In some cases, the purifying medium 238 is a regenerable material or purifier media, and in such cases, it may be desirable to include a regeneration system or apparatus 250 in the purifier 200 in communication with the canister or container 234. The regeneration system 250 may take a variety of forms, with regeneration systems being well-known in the fluid and gas purification industries. The regeneration system or mechanism 250 functions to regenerate the purifier medium 238 in situ or without removal from the canister 234. In other cases, it may be useful to configure the purifier 200 and purifying stage 230 for purging of the canister 234 and/or of piping and other components of the purifier 200. The purifier 200 is also preferably configured for ready insertion and replacement of the purifier medium/mechanism 238 to facilitate maintenance of the purifier 200. A vacuum source may also be provided along with valves, pressure controls, a vacuum source, and the like useful for operating and maintaining the purifier 200 and as will be understood by those skilled in the art.

Figure 3:
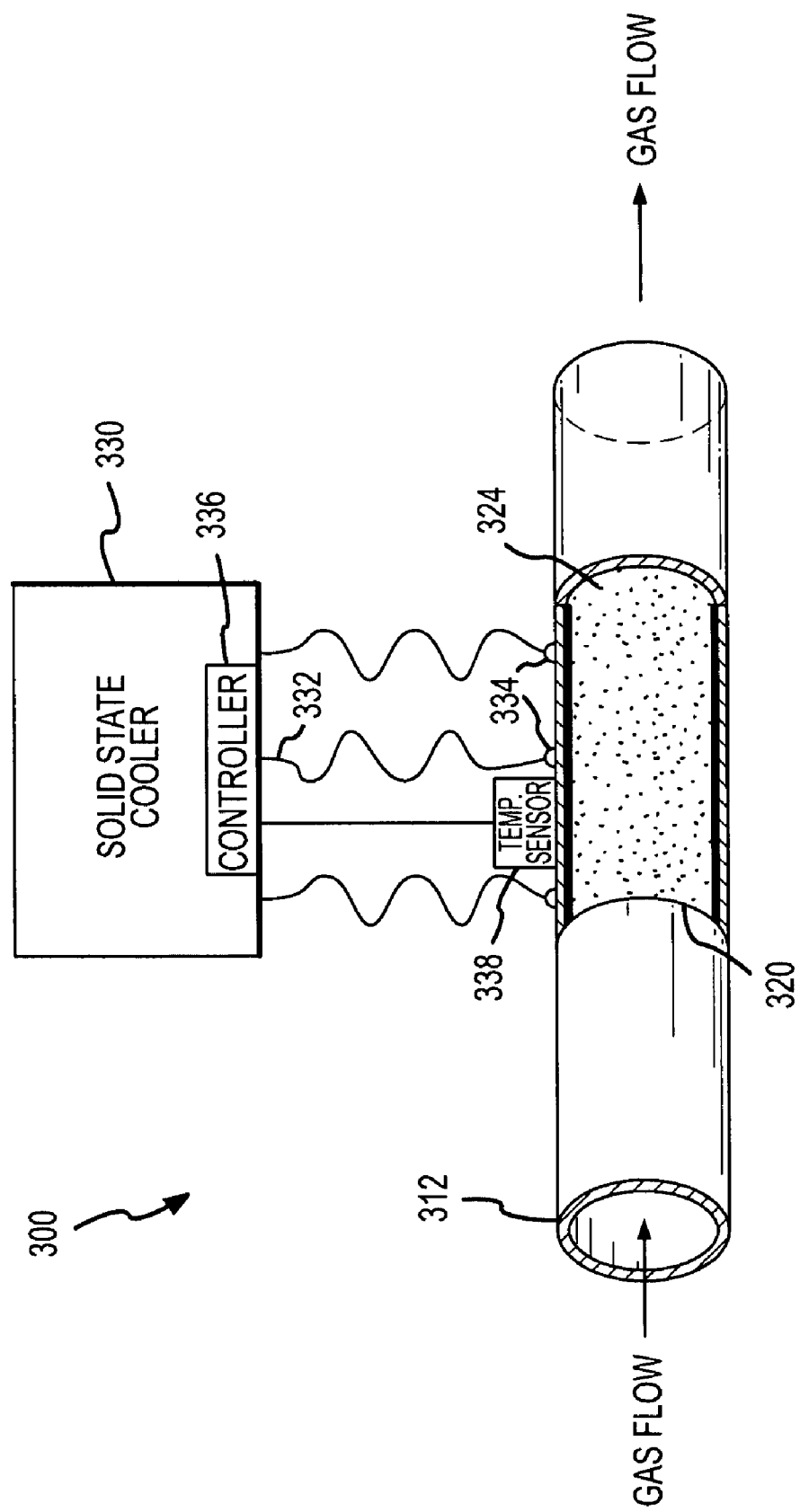
FIG. 3 illustrates a purification system according to the invention that shows one embodiment of a cooler for maintaining the purifying or filtering temperature of purifier material at a desired point below ambient temperature.

FIG. 3 illustrates a more specific embodiment of a purifier 300 according to the concepts of the invention. As shown, the cryo-purifier 300 includes a conduit 312 (e.g., a stainless steel tube/pipe such as 316L SS tube) with an inlet for receiving input gas or fluid and directing purified fluid or gas out after processing to remove impurities. The fluid or gas flow is directed to a canister 320 (or container/purifying stage of conduit 312) that contains purification material or medium 324, which in one embodiment is a Ni filter frit. The purification material 324 may also be a high surface area material such as zeolite, mordenite, carbon, alumina, silica, metals, and other organic and/or inorganic substrates or a combination of such materials. Further, the high surface area material may be, in some embodiments, coated with a reactive metal or other species designed and/or selected to remove a specific impurity. For example, the reactive species may be selected from the alkali earth metals, the alkaline earth metals, or the transition metals, with the selection being made to remove a particular impurity.

A solid state cooler 330 is provided to lower the temperature of the material or mechanism 324 from ambient temperature to a desired purifying temperature. To this end, the solid state cooler 330 includes a controller 336 for operating the cooler 330 in response to a temperature sensed by sensor 338 at the outer wall or surface of the canister 320 (or, optionally, at a point in the material/medium 324 with a probe sensor). The cooler 330 includes thermal conductors 332 linked to thermal grease 334 in this embodiment, but, of course, other cooling mechanisms and techniques may be used to cool the material 324. The purification canister 320 is in direct thermal contact with the thermoelectric device provided by cooler 330, thermal conductors 332, and thermal grease 334 such that the temperature of the purifier material or medium 324 can be carefully controlled. Optionally, a pre-cooler can be provided upstream from the purifier canister 320 or the temperature of the material 324 may be controlled so as to account for heat transferred from the matrix gas or fluid to the material 324 as the input fluid is cooled. The matrix fluid or input gas is caused to flow through the purifier material 324 and impurity or impurities of interest are trapped, and the purified fluid or gas is output of the purifier conduit 312, such as to point of use or for storage for later use.

A principle underlying embodiments of the invention involves the cooling of a purifier medium or media mixture in a purifier to improve the effectiveness of the purifier. Such cooling of the purifier contents or material drives the adsorption equilibrium of impurities in a matrix gas or fluid in the direction of surface adsorption. A similar principle can be seen at work in the design of high vacuum cryogenic pumps to improve adsorption of moisture and air species by molecular sieve. With cryogenic cooling of the purifier material, medium, or media mixture, the inventors believe the adsorption equilibrium of a molecular sieve adsorbent can be shifted by several orders of magnitude, and the resulting "cryo-pump" is capable of creating a vacuum on the order of E-10 torr.

Figure 4:
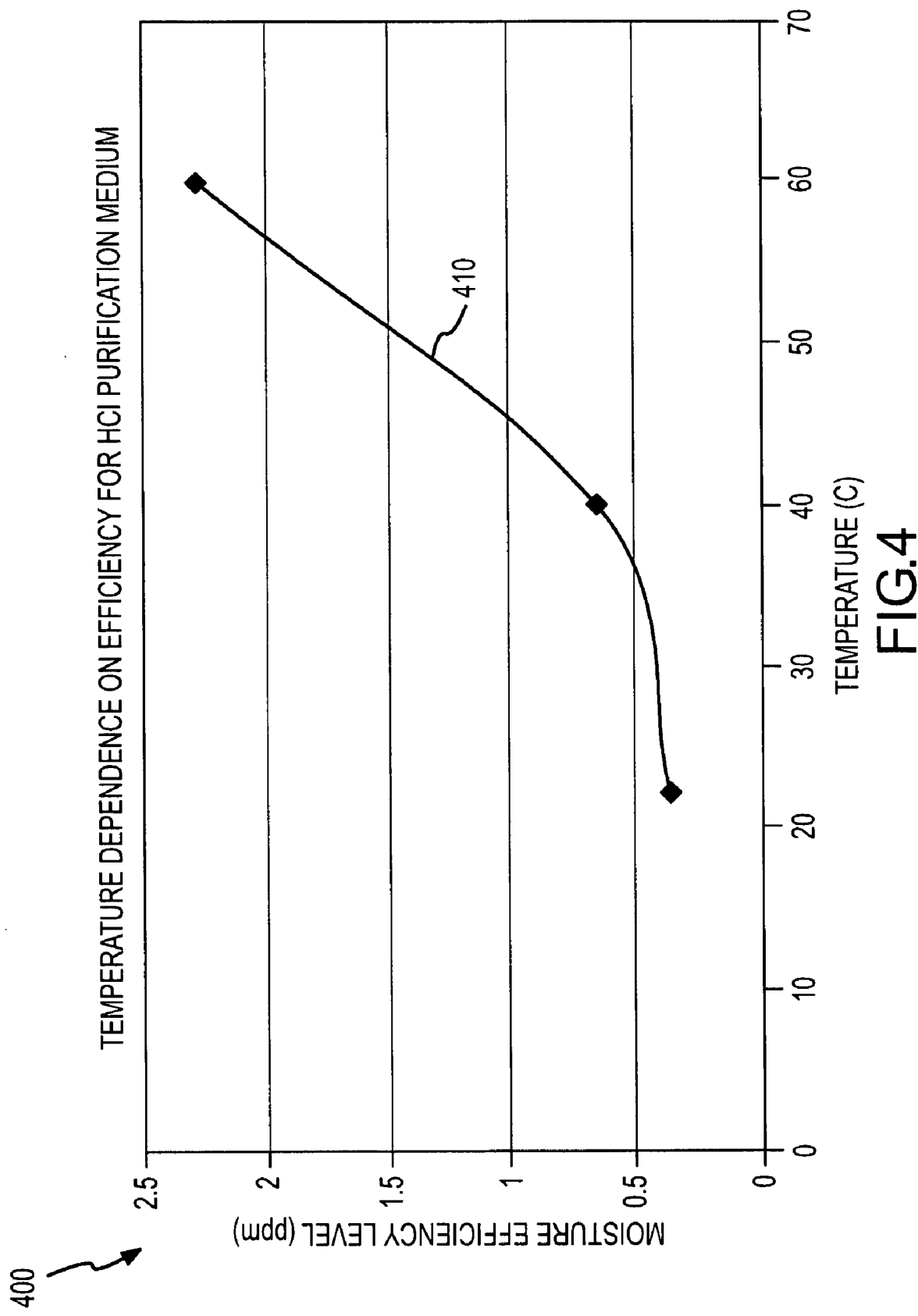
FIG. 4 is a graph illustrating dependency of a particular purifier medium on temperature.

In addition to theoretical data, the inventors have obtained empirical data that shows the effect of temperature on the efficiency of a purification material that operates under the mechanism of adsorption. Specifically, FIG. 4 illustrates one set of empirical data collected by the inventors for an adsorption-based purifier material. The graph 400 of FIG. 4 illustrates with curve 410 the temperature dependence on moisture removal efficiency for convention purifier material used at room temperature and higher temperatures. All data points in curve 410 were collected for HCl gas at 1 slpm and 612 psig with a moisture challenge level of approximately 18 ppm. As shown, the efficiency level of the adsorption-based purifier material decreases with increasing temperatures above ambient temperature (i.e., about or somewhat above 20° C.). Conversely, the efficiency level can be thought of as increasing with reducing temperature as shown by curve 410.

The improved results of the present invention are obtained by recognizing the improved efficiency shown in graph 410 with lowering temperatures and further applying the cryopump concept to the removal of impurities in a flowing matrix fluid. The performance of a given purifier material is thus enhanced by the use of temperatures lower than ambient temperature and typically, the use of temperatures much lower than ambient or room temperature, such as temperatures of 0 to −20° C. or lower or such as temperatures 20 to 60° C. or more below ambient temperature. The cooling of purification material has proven particularly effective as a surface adsorption enhancement technique.

In preferred embodiments of the invention, an incoming fluid is cooled, such as by a thermoelectric cooler in a pre-cooler stage or in the purifying stage, and the cooled or cold purification medium is a trap or high surface area metal substrate. The cold trap may be a stainless steel, nickel, or other metal trap such as a coiled line or particle filter. The high surface area metal substrate or trap can be in nearly any shape or design that is conducive to a typical gas distribution system. Further, the high surface area material can be in the form of sintered or pressed materials and can take the shape of a frit, a cylinder, a disk, a cone, or other useful purifier insert shape. To obtain desired cooling, a cooler is provided for lowering the temperature of the high surface area material to a desired purifying temperature below ambient temperature. For example, as shown in FIG. 3, a substrate may be in direct thermal contact with a thermoelectric device to allow the temperature of the metallic substrate or purifying element (i.e., purifying material, medium, media, or the like) to be carefully controlled.

Figure 5:
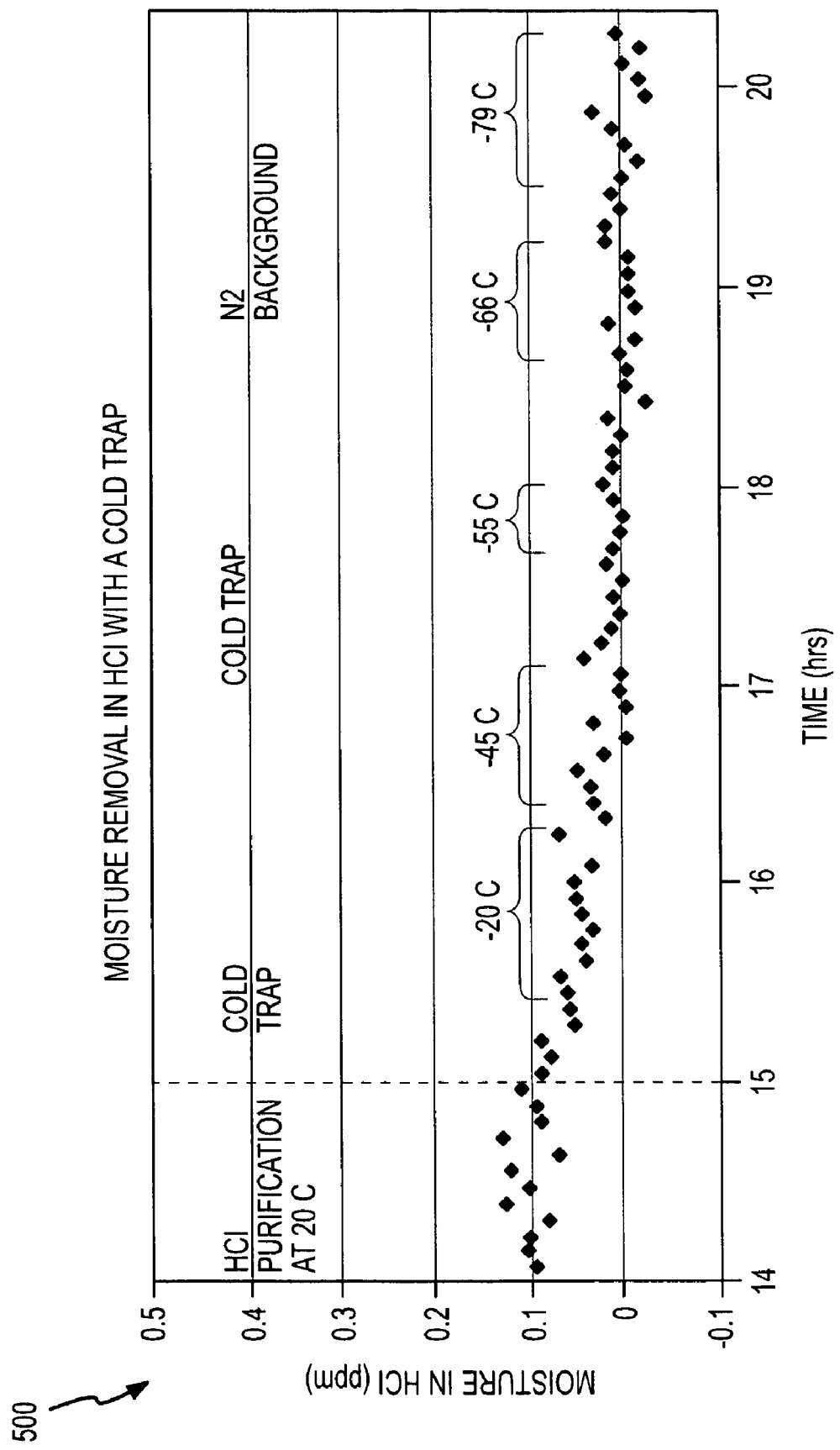
FIGS. 5 and 6 illustrate the results of tests related to moisture removal from HCl gas with the purifier medium at ambient temperatures and at reduced or low purifying temperatures or with a cold trap.
Figure 6:
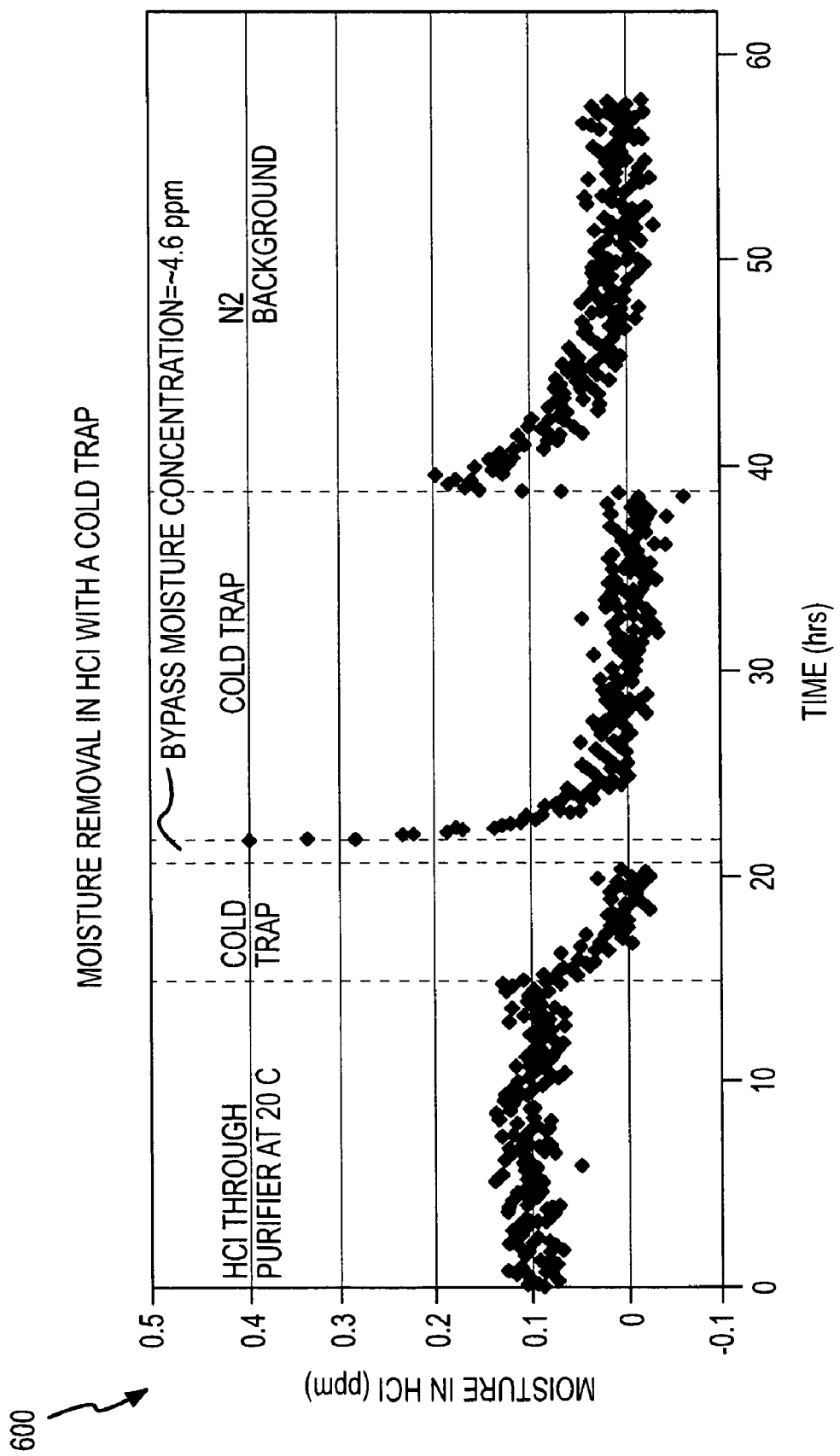

FIGS. 5 and 6 illustrate with graphs 500 and 600 that by carefully and selectively controlling a purifying temperature of a metallic substrate (e.g., creating and using a cold trap) targeted impurities can be discriminately removed via adsorption, condensation, and/or filtration from a matrix fluid. The test results shown with graphs 500 and 600 were obtained by measuring moisture removal from HCl gas (i.e., HCl gas as a matrix fluid and moisture as a targeted impurity). The results were obtained by operation of a low temperature purifier similar to the purifier 300 shown in FIG. 3 with a high surface area nickel material as the purifier medium. Referring to FIG. 5, the graph 500 initially shows HCl purification with a room or ambient temperature purifiers that provides 0.1 ppm levels of moisture. Use of a cold trap was provided at 15 hours in the test and the results provided in graph 500 illustrate the efficiency of the purifying medium or material is dependent on the operational temperature of the cold trap.

Relevant to the present invention, the efficiency of the purifying material or medium improves as the temperature is lowered from ambient with marked improvements being seen as the temperature is lowered to −20° C. and then further lowered to about −80° C. As shown, the use of the cold trap operated at low temperatures can produce results or levels of moisture in HCl approaching 0.01 ppm, which is a large improvement of the 0.1 ppm levels obtained by a purifier using similar purifying materials that is operated at ambient temperature or 20° C. (in this case).

Note, it may be useful in some applications to use the cold trap in series or combination with an ambient temperature purifier to effectively remove impurities (as is shown in FIG. 7) or the ambient temperature purifier may sometimes be replaced entirely (as is shown in FIG. 8). The use of a traditional purification material operating at 20° C. for moisture removal in HCl is further shown in the graph 600 of FIG. 6, and such a traditional purifier is shown as able to reach an ultimate moisture efficiency of 0.1 ppm. When a cold trap is used in combination with the purifier, such as serially, downstream as shown in FIG. 7, the moisture level decreases to approximately 0.01 to 0 ppm.

The use of a reduced temperature or cryogenic purifier has many applications. For example, as shown in FIGS. 7 and 8, the low temperature purifier may be used in the semiconductor integrated circuit fabrication industry where it can be used as part of a point-of-use process gas delivery system or line to purify electronic grade process gases such as to provide ultra-pure gases, e.g., gases with part-per-billion impurity levels or lower. Low temperature purifiers have numerous other applications including those in which a very high purity fluid is desirable and in which the target purity is difficult to achieve using conventional purification such as operating a purifier at ambient or higher temperatures.

The following listing provides examples envisioned by the inventors of matrix fluids that may be purified with a low temperature purifier of the present invention along with potential impurities that may be effectively removed from such matrix fluids.

| | Matrix Fluid/Gas | Target Impurities |
|---|---|---|
| 1. | Ammonia | water, $CO_2$, carbamate, $CH_4$ |
| 2. | Argon | water, $CO_2$, CO, hydrocarbons, $CH_4$ |
| 3. | Arsine | water, $CO_2$, CO, $GeH_4$, $H_2S$, $PH_3$, $SiH_4$, Ionic Liquid (IL) |
| 4. | Boron Trichloride | volatile metals, CO, $CO_2$ |
| 5. | Boron Triflouride | $CO_2$, SiF4, $SO_2$, HF, water, IL |
| 6. | Carbon Monoxide | water, nickelcarbonyl, iron carbonyl, $CO_2$, hydrocarbons |
| 7. | Chlorine | water, volatile metals, CO, hydrocarbons, $CO_2$ |
| 8. | Dichlorosilane | $SiCl_4$, other chlorosilanes, fluorocarbons, hydrocarbons |
| 9. | Disilane | Chlorosilanes (TCS, DCS), Siloxanes, other higher silanes, hydrocarbons, water, $CO_2$ |
| 10. | Germane | moisture, Digermane, germoxanes, trigermane, chlorogermanes, IL, hydrocarbons, CO, $CO_2$ |
| 11. | Halocarbon 14 (tetrafluoromethane) | water, other fluorocarbons, CO, $CO_2$, HF, $SF_6$, hydrocarbons |
| 12. | Halocarbon 23 (triflouromethane) | water, other fluorocarbons, $CO_2$, HF, $SF_6$, hydrocarbons |
| 13. | Halocarbon 32 (difluoromethane) | water, other fluorocarbons, $CO_2$, HF, $SF_6$, hydrocarbons |
| 14. | Halocarbon 41 (methyl fluoride) | water, other fluorocarbons, $CO_2$, HF, $SF_6$, hydrocarbons |
| 15. | Halocarbon 116 (hexafluoroethane) | water, other fluorocarbons, $CO_2$, HF, $SF_6$, hydrocarbons |
| 16. | Halocarbon 125 (pentafluoroethane) | water, other fluorocarbons, $CO_2$, HF, $SF_6$, hydrocarbons |
| 17. | Halocarbon 134a (tetrafluoroethane) | water, other fluorocarbons, $CO_2$, HF, $SF_6$, hydrocarbons |
| 18. | Halocarbon 152a (difluoroethane) | water, other fluorocarbons, $CO_2$, HF, $SF_6$, hydrocarbons |
| 19. | Halocarbon 218 (perfluoropropane) | water, other fluorocarbons, $CO_2$, HF, $SF_6$, hydrocarbons |
| 20. | Halocarbon 236a (hexafluoropropane) | water, other fluorocarbons, $CO_2$, HF, $SF_6$, hydrocarbons |
| 21. | Halocarbon C318 (octafluorocyclobutane) | water, other fluorocarbons, $CO_2$, HF, $SF_6$, hydrocarbons |
| 22. | Helium | water, $CO_2$, hydrocarbons, CO |
| 23. | Hydrogen | water, $CO_2$, hydrocarbons, CO |
| 24. | Hydrogen Bromide | water, volatile metals, hydrocarbons, CO, $CO_2$ |
| 25. | Hydrogen Chloride | water, $Cl_2$, $COCl_2$, HBr, volatile metals, CO, $CO_2$, hydrocarbons |
| 26. | Hydrogen Fluoride | water, $SO_2$, $H_2SO_4$, hexafluoro silicic acid |
| 27. | Methylsilane | water, chlorosilanes, other higher molecular weight methylsilanes, hydrocarbons, |
| 28. | Nitrogen | water, $CO_2$, hydrocarbons, CO |
| 29. | Nitrogen Trifluoride | moisture, HF, $N_2O$, $SF_6$, $CO_2$, CO, $CF_4$ |
| 30. | Nitrous Oxide | water, $NH_3$, NO, $NO_2$, $N_yO_x$, $CO_2$, hydrocarbons, CO |
| 31. | Octafluorocyclopentene | water, HF, hexafluoro cyclobutene, other fluorocarbons, hydrocarbons |
| 32. | Oxygen | water, hydrocarbons, $CO_2$ |
| 33. | Phosphine | water, $CO_2$, CO, hydrocarbons, arsine, germane, $H_2S$, silane, IL |
| 34. | Silane | water, methylsilanes, disilane, hydrocarbons, chlorosilanes, siloxanes, IL |
| 35. | Silicon Tetrachloride | other chlorosilanes, water, siloxanes, chlorooxysilanes, hydrocarbons |
| 36. | Silicon Tetrafluoride | HF, water, CO, $CO_2$, hydrocarbons, chlorosilanes |
| 37. | Sulfur Hexafluoride | water, $CF_4$, hydrocarbons, $SiF_4$ |
| 38. | Trichlorosilane | $SiCl_4$, other chlorosilanes |
| 39. | Tungsten Hexafluoride ($WF_6$) | HF, $SiF_4$, fluorocarbons, $SF_6$ |
| 40. | $F_2$ | HF, IL |
| 41. | NO | $N_xO_y$, $N_2O$, water, IL |
| 42. | Diborane | higher boranes, water, IL |
| 43. | Hydrocarbons | other hydrocarbons |
| 44. | Organometallics | other organometallics, oxygenated organometallics |
| 45. | Germaniium Tetrafluoride | $CO_2$, HF, $SO_2$ |
| 46. | Hydrogen selenide | $H_2S$, water, hydrocarbons |
| 47. | Phosphorus trifluoride | $PF_2Br$, $PFBr_2$, HCl, PxOyClz |

In addition to those specifically listed matrix gases or fluids, the processes described herein are also apt at removing one or more impurities from the additional matrix fluids: rare gases (such as krypton, neon, and xenon), carbon dioxide, nitrogen dioxide, carbonyl sulfide, chlorine trifluoride, halogenated compounds including, but not limited to, $CF_4$, $NF_3$, $CHClF_2$, $CClF_2CF_3$, $CClF_3$, $CHCl_2F$, $CH_2F_2$, and $CH_3F$, and amines including, but not limited to, triethylamine, dimethylamine, and monoethylamine. The hydrocarbons that may be processed with the techniques described herein include, but are not limited to, butadiene, ethane, ethylene, butane, butene, isobutane, propane, propylene, methylacetylene-propadiene ("MAP"), and methylacetylene-propadiene mixtures stabilized with alkane and alkene hydrocarbons. The organometallics may include trimethylgallium, trimethylaluminum, trimethylindium, and the like.

FIG. 7 illustrates a semiconductor manufacturing processing line or system 700 configured according to the invention with a low temperature purifier 750. The low temperature purifier 750 is shown positioned in the line 700 upstream of a semiconductor reactor 760 with a chamber 766, such as a wafer manufacturing chamber, to which purified gas from the purifier 750 is fed or output after removal of impurities. The purifier 750 may take any of the forms discussed in this description such as the purifiers 100, 200, or 300 shown in FIGS. 1-3. As shown, an additional purifier 740, e.g., a NANOCHEM® MTX™ purifier distributed by Matheson Tri-Gas, Inc. or the like, is provided upstream of the purifier 750, and typically, this purifier 740 is a conventional purifier that is operated at ambient temperature to remove the same target impurities as low temperature purifier 750. Of course, purifiers 740, 750 may also be operated to target differing impurities in the matrix fluid or gas flowing in the system 700.

The matrix fluid processed serially by purifiers 740, 750 is supplied by gas cabinet or supply 710. The matrix fluid flows through piping 720 to a valve manifold box (VMB) 730 where it is provided to or directed to the purifiers 740, 750 at a selected flow rate and pressure. Typically, the matrix fluid is output from the valve manifold box 730 at or near ambient temperature. The low temperature purifier 750 includes a purifying medium, media, or material (as discussed with reference to FIGS. 1-3) that is selected to remove one or more target impurities in the matrix fluid. The purifier 750 is operated at a temperature below ambient temperature that is selected to increase the efficiency of the contained purifying material, medium, or media and that is selected for the flow rate and pressure and for the matrix fluid and target impurity (i.e., is above the phase change point for the matrix fluid at the pressure and flow rate).

FIG. 8 illustrates another semiconductor manufacturing process line or system 800 configured according to the invention. As shown, the system 800 includes a gas cabinet or supply 810 for providing an input matrix fluid or gas via piping 820 to a valve manifold box (VMB) 830. The VMB 830 is operated to control the flow rate and pressure of the matrix fluid that is input to the semiconductor reactor 860 and its chamber 866. The system 800 differs from system 700 in that a low temperature purifier 854 according to the invention is provided as a standalone unit or standalone purifier to remove impurities while operating at a temperature below ambient and to output purified gas for use by the reactor 860 (or other point of use).

The system 800 also differs from the system 700 by further controlling the temperature of the matrix fluid with a pre-cooler 852 provided upstream from the low temperature cooler 854. The pre-cooler 852, as discussed with reference to FIGS. 1 and 2, is provided to cool the matrix or input fluid from the VMB 830 from ambient (or higher temperatures) to a temperature at or near the operating temperature or purifying temperature of the low temperature purifier 854. The pre-cooled fluid may be at a temperature somewhat above or below the operating temperature to practice the invention (but not below the change phase point temperature of the matrix fluid) with the pre-cooler 852 providing a heat transfer function that may be difficult to achieve with purifying media, medium, or material in the purifier 854. A heater 856 is provided downstream of the low temperature purifier 854 to condition the purified gas/fluid to a temperature that is acceptable for process fluid/gas input to the chamber 866 of the reactor 860, and this temperature may be ambient temperature or another temperature useful for process gases for reactor 860 (or for another point of use).

As will be appreciated by those skilled in the refrigeration/cooling industries, cooling for the low temperature or cryo purifiers of the invention can be achieved by a variety of techniques, such as commercially available coolers. The cooling technique or cooler selected may depend upon the heat load needed to cool the flowing matrix fluid to a target temperature or temperature range. The coolers may be simple refrigerators or take the form of a Stirling cooler, a Peltier cooler, a vortex cooler, a Venturi cooler, a cryogenic cooling bath, and/or other forms known in the art or developed for this particular use/function. Generally, it is preferred that the cooler would be a simple, self-contained unit that requires only electrical power or other readily available power to drive the cooler with low power consumption. Small size will often also be preferred or desirable. In some embodiments, the ability to vary the cryogenic temperature may be useful to allow setting the purifying temperature for differing target impurities, differing matrix fluids (and flow rates and pressures), and/or differing purifying material, medium, or media (and differing configurations of such cooled purifying elements). The cooler preferably is able to hold the purifier canister or container and its contents at a set purifying temperature, such as via a thermocouple or other feedback loop.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims that follow. For example, the discussion has stressed the increased efficiency possible by enhanced physical adsorption by cooled purifying medium, but the cooled or low temperature purifier concept is applicable to other impurity removal mechanisms including, but not limited to, chemisorption, irreversible reaction, precipitation, condensation, filtration, and/or a combination of such mechanisms.

We claim:

1. A low temperature purifier for processing a matrix fluid to remove one or more impurities, comprising:
    a pre-cooler receiving the matrix fluid at a first temperature, pressure, and flow rate and outputting the matrix fluid at a second temperature that is lower than the first temperature;
    a purifier element comprising a volume of a high surface area material;
    a container comprising a steel pipe for containing the purifier element comprising a metal particle filter that comprises sintered, pressed, and/or plated nickel, stainless steel, corrosion resistant alloy, and/or an alloy selected for removing a particular one of the impurities, the container including an inlet for receiving the matrix fluid, wherein the input matrix fluid comprises a quantity of an impurity greater than about 100 parts per billion from the pre-cooler and an outlet for outputting the matrix fluid after the matrix fluid flows through the purifier element, wherein the output matrix fluid comprises less than 100 parts per billion of the impurity; and
    a cooler in thermal contact with an outer surface of the container cooling the outer surface of the container to a purifying temperature, the purifying temperature being selected to be below ambient temperature and above a phase change point of the matrix fluid at the pressure and the flow rate of the matrix fluid.

2. The purifier of claim 1, wherein the purifying temperature is in the range of about 0° C. to about −200° C.

3. The purifier of claim 1, wherein the high surface area material comprises at least one material selected from the group consisting of mordenite, zeolite, alumina, silica, and carbon.

4. The purifier of claim 1, wherein the cooler is in thermal contact with the pre-cooler to provide cooling to the matrix fluid flowing through the pre-cooler.

5. A method of purifying a matrix fluid flowing at particular pressure and a flow rate, comprising:
    providing a purifying medium in a flow path of the matrix fluid;
    cooling the purifying medium to a purifying temperature selected to be in a temperature range of about 0 to −200° C. and above the phase change point for the matrix fluid at the pressure and the flow rate;
    first directing the matrix fluid through a pre-cooler stage wherein the matrix fluid is cooled to a temperature in the temperature range, wherein the matrix fluid comprises a quantity of an impurity greater than about 100 parts per billion before the first directing through the pre-cooler stage; and
    second directing the matrix fluid to flow through the purifying medium, wherein the quantity of the impurity in the matrix fluid is reduced to less than about 100 parts per billion after the second directing through the purifying medium.

6. The method of claim 5, wherein the purifying medium comprises a high surface area material comprising at least one material selected from the group consisting of mordenite, zeolite, alumina, silica, carbon, and sintered, pressed and/or plated metal or metal alloy.

7. The method of claim 5, wherein the temperature the matrix fluid is cooled to in the pre-cooler stage is about the purifying temperature and wherein the cooling of the purifying medium comprises operating a cooler in thermal contact with an exterior surface of a canister containing the purifying medium to cool the canister exterior surface to a canister temperature equal to or lower than about the purifying temperature.

8. The method of claim 5, wherein after the second directing the quantity of ionic fluid in the matrix fluid is reduced to less than about 10 parts per billion.

9. The method of claim 5, wherein prior to the first directing the matrix fluid comprises a quantity of the impurities greater than about 1000 parts per billion.

10. The method of claim 5, wherein the purifying medium comprises a high surface area metal comprising sintered, pressed, and/or plated nickel, stainless steel, corrosion resistant alloy, and/or an alloy selected for removing a particular one of the impurities.

11. The method of claim 5, wherein the method comprises heating the purified matrix fluid to a temperature of at least about ambient temperature.

12. The method of claim 5, wherein the matrix fluid comprises a gas selected from the group of gases consisting of an amine, ammonia, argon, arsine, boron trichloride, boron trifluoride, carbon dioxide, carbon monoxide, carbonyl sulfide, chlorine, chlorine trifluoride, dichlorosilane, disilane, germane, a halocarbon, a halogenated compound, helium, hydrogen, hydrogen bromide, hydrogen chloride, hydrogen fluoride, methylsilane, nitrogen, nitrogen dioxide, nitrogen trifluoride, nitrous oxide, octafluorocyclopentene, oxygen, phosphine, a rare gas, silane, silicon tetrachloride, silicon tetrafluoride, sulfur hexafluoride, trichiorosilane, $WF_6$, $F_2$, NO, diborane, a hydrocarbon, an organometallic, germaniium tetrafluoride, hydrogen selenide, and phosphorus trifluoride.

13. A method of purifying a matrix fluid flowing at particular pressure and a flow rate, comprising:
providing a purifying medium in a flow path of the matrix fluid;
cooling the purifying medium;
first directing the matrix fluid through a pre-cooler stage wherein the matrix fluid is cooled to a temperature in a temperature range, wherein the matrix fluid comprises a quantity of an impurity greater than about 100 parts per billion before the first directing through the pre-cooler stage; and
second directing the matrix fluid to flow through the purifying medium, wherein the quantity of the impurity in the matrix fluid is reduced to less than about 100 parts per billion after the second directing through the purifying medium.

14. The method of claim 13, wherein the purifying medium is cooled to a purifying temperature selected to be in a temperature range of about 0 to −200° C. and above the phase change point for the matrix fluid at the pressure and the flow rate.

15. The method of claim 13, wherein the purifying medium is cooled to a purifying temperature that is less than about negative 20° C.

16. The method of claim 13, wherein after the second directing the quantity of the impurity in the matrix fluid is reduced to less than about 10 parts per billion.

17. A method of purifying a matrix fluid flowing at particular pressure and a flow rate, comprising:
providing a purifying medium in a flow path of the matrix fluid;
cooling the purifying medium;
first directing the matrix fluid through a pre-cooler stage wherein the matrix fluid is cooled to a temperature in a temperature range, wherein the matrix fluid comprises a quantity of an impurity greater than about 100 parts per billion before the first directing through the pre-cooler stage; and
second directing the matrix fluid to flow through the purifying medium, wherein the quantity of the impurity in the matrix fluid is reduced to less than about 10 parts per billion after the second directing through the purifying medium.

18. The method of claim 17, wherein the purifying medium is cooled to a purifying temperature selected to be in a temperature range of about 0 to −200° C. and above the phase change point for the matrix fluid at the pressure and the flow rate.

* * * * *